United States Patent
Stokes et al.

(10) Patent No.: US 8,860,994 B2
(45) Date of Patent: Oct. 14, 2014

(54) ELECTRONIC REPLACEMENT OF PRE-PRINTED FORMS

(75) Inventors: David L. Stokes, Longmont, CO (US); Susan M. Saad, Broomfield, CO (US); Michael G. Lotz, Longmont, CO (US)

(73) Assignee: Ricoh Production Print Solutions, Boulder, CO (US)

( * ) Notice: Subject to any disclaimer, the term of this patent is extended or adjusted under 35 U.S.C. 154(b) by 137 days.

(21) Appl. No.: 13/571,808

(22) Filed: Aug. 10, 2012

(65) Prior Publication Data

US 2014/0043645 A1 Feb. 13, 2014

(51) Int. Cl.
*G06F 3/12* (2006.01)

(52) U.S. Cl.
USPC .......... 358/1.15; 358/1.18; 358/1.9; 358/1.12; 715/221; 715/222; 715/223; 715/224; 715/225; 707/999; 707/103; 707/104; 382/284

(58) Field of Classification Search
CPC ... G06F 17/243; G06F 17/211; G06F 17/248; G06F 3/1243
USPC ........ 358/1.15, 1.18, 1.9, 1.12; 715/221, 222, 715/223, 224, 225; 707/999.103, 999.104; 382/284
See application file for complete search history.

(56) References Cited

U.S. PATENT DOCUMENTS

| | | | |
|---|---|---|---|
| 4,334,771 A | 6/1982 | Ryan, Jr. | |
| 5,291,243 A | 3/1994 | Heckman et al. | |
| 5,495,561 A * | 2/1996 | Holt | 358/1.15 |
| 5,592,683 A | 1/1997 | Chen et al. | |
| 5,768,488 A | 6/1998 | Stone | |
| 6,067,554 A * | 5/2000 | Hohensee et al. | 715/209 |
| 6,473,892 B1 | 10/2002 | Porter | |
| 6,734,872 B1 | 5/2004 | Varga | |
| 7,436,546 B2 | 10/2008 | Aschenbrenner et al. | |
| 7,562,294 B1 | 7/2009 | Buis et al. | |
| 7,577,693 B2 | 8/2009 | Aden et al. | |
| 7,880,719 B2 | 2/2011 | Kritt et al. | |
| 7,944,593 B2 | 5/2011 | Aschenbrenner et al. | |
| 8,477,377 B2 | 7/2013 | Stanich et al. | |
| 2002/0149546 A1 | 10/2002 | Ben-Chorin et al. | |
| 2002/0171871 A1 | 11/2002 | Catt et al. | |
| 2003/0158775 A1 | 8/2003 | Chaum | |
| 2003/0234954 A1 | 12/2003 | Hohensee et al. | |
| 2004/0120011 A1 | 6/2004 | Double | |
| 2004/0130751 A1 | 7/2004 | Hirtenreiter et al. | |

(Continued)

FOREIGN PATENT DOCUMENTS

EP 0349455 A3 1/1990

OTHER PUBLICATIONS

Hirohiko, Nakazato, "Ubiquitous Printing Services", Oki Technical Review, Apr. 2007/Issue 210 vol. 74 No. 2, (2007), 62-65.
PCT Search Report and Written Opinion, PCT/US12/27741, 7 pages.

*Primary Examiner* — Jacky X Zheng
(74) *Attorney, Agent, or Firm* — Blakely, Sokoloff, Taylor & Zafman LLP

(57) ABSTRACT

A method is disclosed. The method includes receiving an input print job file including a form definition (formdef), determining whether the formdef is an N-up formdef and generating an output print job file by inserting a forms overlay into the input print job file as a pre-printed form if the formdef is an N-up formdef.

18 Claims, 3 Drawing Sheets

(56) References Cited

U.S. PATENT DOCUMENTS

| | | |
|---|---|---|
| 2005/0094207 A1 | 5/2005 | Lo |
| 2005/0213139 A1 | 9/2005 | Mach |
| 2005/0216856 A1 | 9/2005 | Matti |
| 2005/0230965 A1 | 10/2005 | Field |
| 2005/0248787 A1 | 11/2005 | Aschenbrenner et al. |
| 2005/0280847 A1 | 12/2005 | Cairns et al. |
| 2008/0130028 A1* | 6/2008 | Joergens et al. ............... 358/1.9 |
| 2008/0130049 A1 | 6/2008 | Tsai |
| 2008/0158605 A1 | 7/2008 | Engbrocks |
| 2008/0301678 A1 | 12/2008 | Bottcher |
| 2009/0110270 A1 | 4/2009 | Poor |
| 2009/0147019 A1 | 6/2009 | Yao |
| 2009/0201522 A1 | 8/2009 | Iguchi |
| 2010/0053673 A1 | 3/2010 | Oba |
| 2010/0149588 A1 | 6/2010 | Honda |
| 2010/0153176 A1 | 6/2010 | Sussmeier et al. |
| 2010/0241952 A1 | 9/2010 | Condon et al. |
| 2010/0296124 A1 | 11/2010 | Joergens |
| 2011/0075195 A1 | 3/2011 | Cain |
| 2011/0204141 A1 | 8/2011 | Jones |
| 2012/0013922 A1* | 1/2012 | Lotz et al. ...................... 358/1.9 |
| 2012/0120426 A1 | 5/2012 | Clermont et al. |
| 2013/0063738 A1* | 3/2013 | Lewis et al. .................... 358/1.9 |
| 2013/0086499 A1 | 4/2013 | Dyor et al. |

\* cited by examiner

ELECTRONIC REPLACEMENT OF PRE-PRINTED FORMS

FIELD OF THE INVENTION

The present invention relates to the field of printing, and in particular, to merging print job data with an overlay form.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer. Once a connection is established between a computer and the printer, printing software is implemented at a print server to manage a print job through the complete printing process.

Often, print jobs are produced by combining document data with forms data (e.g. text, graphics and images) that exist on a pre-printed medium (e.g., paper). However, pre-printed forms are costly and cumbersome. Particularly, printer users struggle with the cost and logistics of specifying, purchasing, storing, moving and controlling large volumes of pre-printed forms.

Conventional electronic solutions include simple insertion of an overlay into print job pages without regard to the specifics of the print job file. This may result in improper mixing (e.g., the forms overlay may cover page content) or undesired offsets of the overlay. Further, the introduction of overlays may compromise advanced automatic document feeder (ADF) functions (e.g., mailpiece sortation, co-mingling, and flex print).

Accordingly, a mechanism for an electronic implementation of pre-printed overlays without compromising print job quality and printer functions is desired.

SUMMARY

In one embodiment, a method is disclosed. The method includes receiving an input print job file including a form definition (formdef), determining whether the formdef is an N-up formdef and generating an output print job file by inserting a forms overlay into the input print job file as a pre-printed form if the formdef is an N-up formdef.

In a further embodiment, a printing system includes a controller to receive an input print job file including a formdef, determine whether the formdef is an N-up formdef and generate an output print job file by inserting a forms overlay into the input print job file as a pre-printed form if the formdef is an N-up formdef.

BRIEF DESCRIPTION OF THE DRAWINGS

Embodiments of the present invention may be understood more fully from the detailed description given below and from the accompanying drawings of various embodiments of the invention. The drawings, however, should not be taken to be limiting, but are for explanation and understanding only.

DETAILED DESCRIPTION OF THE INVENTION

An electronic pre-printed form is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
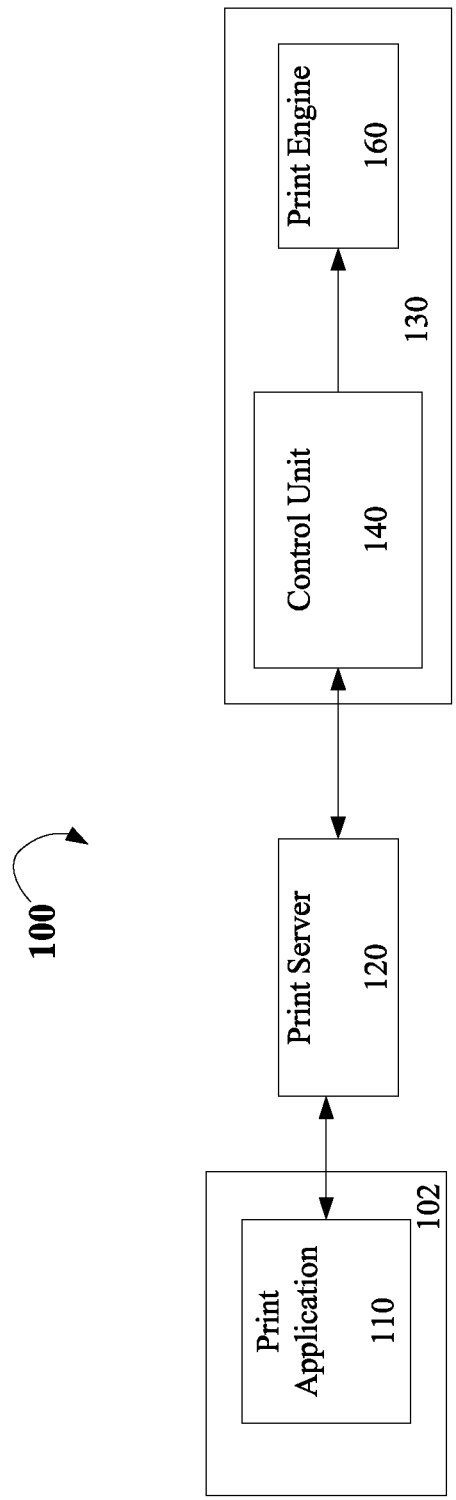
FIG. 1 is a block diagram illustrating one embodiment of a print system.
Figure 2:
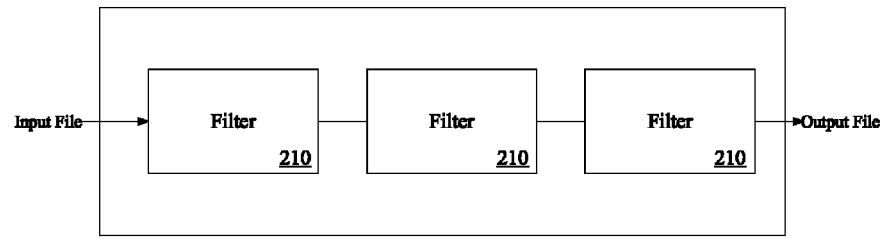
FIG. 2 illustrates one embodiment of filters.

FIG. 1 illustrates one embodiment of a printing system 100. Printing system 100 includes a print application 110 operating on a data processing system, a server 120 and a printer 130 that are implemented to produce documents generated from print jobs. Print application 110 makes a request for the printing of a document. In one embodiment, print application 110 implements the Advanced Function Presentation (AFP™) architecture. According to the AFP architecture, documents may include combinations of text, image, graphics, and/or bar code objects in device and resolution independent formats. Documents may also include and/or reference fonts, overlays, and other resource objects, which are required at presentation time to present the data properly.

In an AFP embodiment print application 110 provides a Mixed Object Document Content Architecture (MO:DCA) data stream to print server 120. According to one embodiment, the AFP MO:DCA data streams are object-oriented streams including, among other things, data objects, page objects, and resource objects. Print server 120 processes pages of output that mix all of the elements normally found in presentation documents, e.g., text in typographic fonts, electronic forms, graphics, image, lines, boxes, and bar codes. The AFP MO:DCA data stream includes architected, structured fields that describe each of these elements.

In one embodiment, print server 120 communicates with control unit 140 via an Intelligent Printer Data Stream (IPDS). The IPDS data stream is similar to the AFP data steam, but is built specific to the destination printer in order to integrate with each printer's specific capabilities and command set, and to facilitate the interactive dialog between the print server 120 and the printer. The IPDS data stream may be built dynamically at presentation time, e.g., on-the-fly in real time. Thus, the IPDS data stream is provided according to a device-dependent, bi-directional, command/data stream.

Printer 130 includes a control unit 140 and a print head 160. Control unit 140 processes and renders objects received from print server and provides sheet maps for printing to print head 160. Control unit 140 includes a rasterizer to prepare pages for printing. Particularly, rasterizer includes a raster image processor (RIP) that converts text and images into a matrix of pixels (bitmap) that will be printed on a page.

In many instances, print job data processed by printing system 100 is applied to a medium having pre-printed forms in order to produce the desired documents. For example, printing system 100 may be implemented to produce statements (e.g., financial, credit card and telephone statements) that include structured data (e.g., corporate graphics, logos, watermarks, etc.). As discussed above, the use of pre-printed forms is expensive and inefficient.

According to one embodiment, a pre-printed form is simulated by inserting an AFP presentation overlay into the AFP datastream to simulate the form. Overlays are page-like resource objects that include data objects and that define their own environment parameters. According to one embodiment, the overlay is included in such a manner as to ensure it appears below all other content. Further, location on the page and placement on front versus back, or both, are configurable.

Overlays may be included directly on a medium presentation space using a keyword on a Medium Modification Control (MMC) structured field. Such overlays are positioned at the origin of the medium presentation space and are called medium overlays. Overlays may also be included on a logical page presentation space using Include Page Overlay (IPO) and Page Modification Control (PMC) structured fields. Such overlays are positioned at an offset from the logical page origin that is defined by the IPO and PMC and are called page overlays. Page overlays that are included with a PMC are also referred to as PMC overlays.

In one embodiment, control unit 140 performs a series of chained, independent filters 310 that process a single AFP file. In an ADF workflow environment this processing is applied prior to indexing, co-mingling, and mailpiece assembly. In a further embodiment, each filter 310 serves as a single, focused purpose that maximizes reusability, testability, and maintenance.

The filters 310 operate in a serial fashion, with each filter 310 taking input from the preceding filter 310 and writing output to the next filter with the last filter in the chain creating an output AFP file. In one embodiment, the input AFP file includes an inline form definition (formdef). A formdef is an AFP resource object that defines the characteristics of the physical form to be printed on, including overlays to be used, position of page data on the form, rotation, duplexing, input drawer, form feed type, print quality, number of copies of each page and the modifications that apply to each set of copies.

Figure 3:
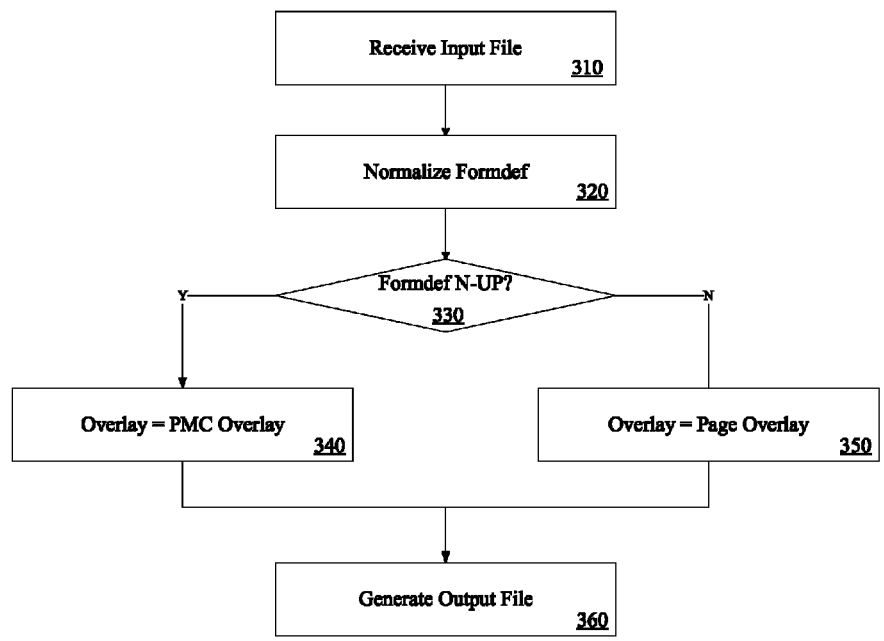
FIG. 3 is a flow diagram for one embodiment of generating a print job with a pre-printed form.

FIG. 3 is a flow diagram for one embodiment of generating a print job with a pre-printed form. At processing block 310, the input AFP file is received. At processing block 320, the formdef is normalized. In one embodiment, normalization comprises converting medium overlays existing in the input AFP file to PMC overlays. In one embodiment, medium overlays in the input file are confined to single partition to enable the recasting of the medium overlay as a PMC overlay, while preserving the original print appearance.

Normalization also includes moving any existing PMC overlays (including overlays that were previously medium overlays) to pages to ensure correct order and layering of pre-existing overlays relative to the new forms overlay. In one embodiment, the forms overlay is ordered first in the page presentation space to ensure that it does not obscure any other page content.

At decision block 330, it is determined whether the formdef is an N-up formdef. N-up is a presentation format where multiple pages are presented on a single physical medium to provide a high degree of flexibility for composing page objects onto sheets. In N-up presentation, each side of a physical medium is divided into a number of equal-size partitions, where the number of partitions is indicated by the number N in N-up.

If it is determined that the formdef is N-up, the forms overlay is introduced as a PMC overlay, processing block 340. In one embodiment, the PMC overlay is placed relative to the medium origin. Further, selective PMC triggering in the PGP2 structured is used as necessary if front only or back only placement is requested.

In a further embodiment, the forms overlay will appear first in the page presentation space since pre-existing overlays in the formdef, medium or PMC, have been moved to pages. Using a PMC overlay placed relative to the medium origin instead of a page overlay is preferred because page overlays cannot be placed relative to a medium origin. Thus, if a formdef offsets pages within a partition the forms overlay will not shift, but will have a constant location on the paper, which better mimics a preprinted form.

If the formdef is not n-up, the forms overlay is introduced as a page overlay, processing block 350. A page overlay is implemented since PMC overlays are not a good option in non-N-up scenarios because selective use of PMC overlays is not possible, which prevents selective front/back placement of the forms overlay. This implementation invokes the forms overlay on the page prior to any other page overlay, which in addition to the normalization of any medium or PMC overlays to pages, ensures the forms overlay will be below all other page content.

If pages are offset within the partition by the formdef, this approach includes determination of the offset of each page and compensating by placing the page overlay at the appropriate negative offset. This compensation is externalized as an option by the implementing filter since not all printers support this so this may fail in some scenarios. At processing block 360, the output AFP file is generated by inserting the overlays into the normalized input file.

Figure 4:
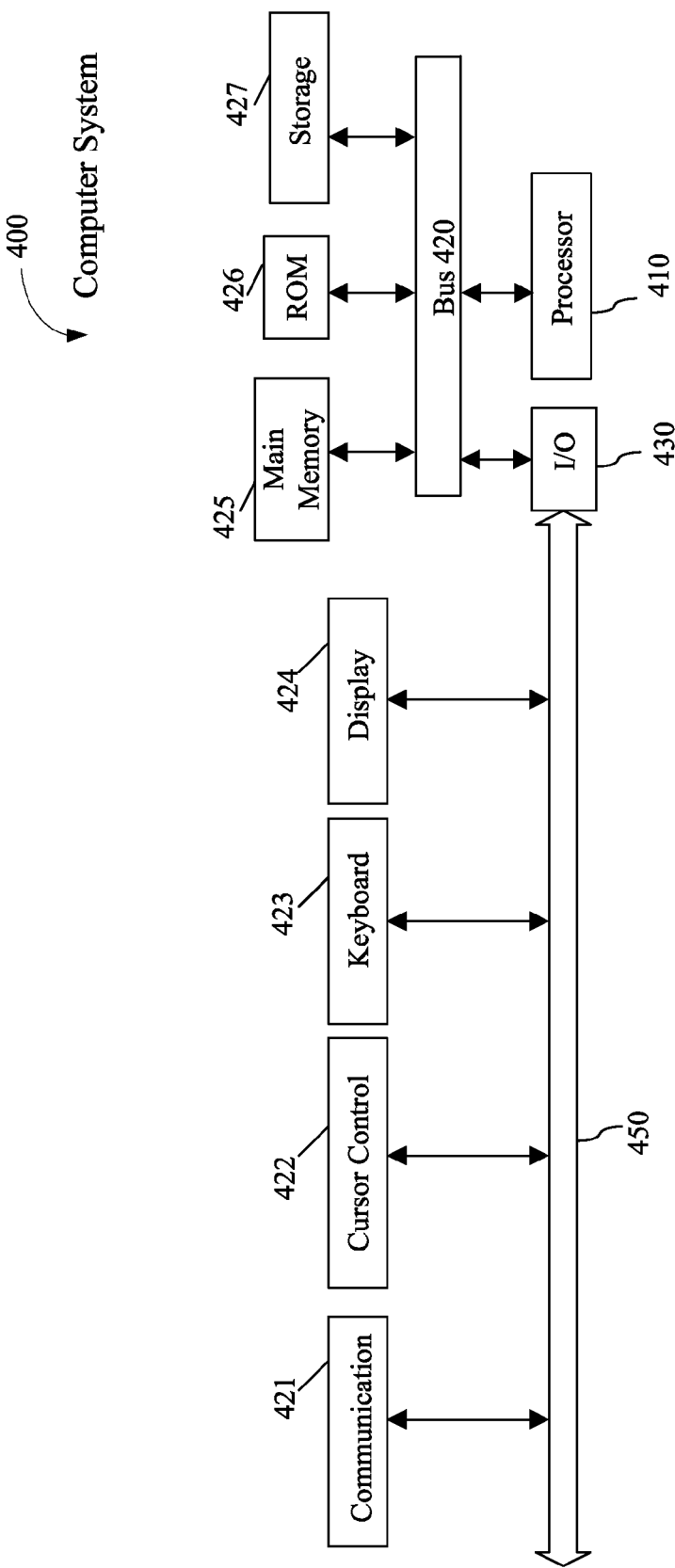
FIG. 4 illustrates one embodiment of a computer system.

FIG. 4 illustrates a computer system 400 on which data processing system 102 and/or server 108 may be implemented. Computer system 400 includes a system bus 420 for communicating information, and a processor 410 coupled to bus 420 for processing information.

Computer system 400 further comprises a random access memory (RAM) or other dynamic storage device 425 (referred to herein as main memory), coupled to bus 420 for storing information and instructions to be executed by processor 410. Main memory also may be used for storing temporary variables or other intermediate information during execution of instructions by processor 410. Computer system 400 also may include a read only memory (ROM) and or other static storage device 426 coupled to bus 420 for storing static information and instructions used by processor 410.

A data storage device 427 such as a magnetic disk or optical disc and its corresponding drive may also be coupled to computer system 400 for storing information and instructions. Computer system 400 can also be coupled to a second I/O bus 450 via an I/O interface 430. A plurality of I/O devices may be coupled to I/O bus 450, including a display device 424, an input device (e.g., an alphanumeric input device 423 and or a cursor control device 422). The communication device 421 is for accessing other computers (servers or clients). The communication device 421 may comprise a modem, a network interface card, or other well-known interface device, such as those used for coupling to Ethernet, token ring, or other types of networks.

The above-describe mechanism provides an AFP overlay as an electronic pre-printed form by ensuring correct mixing of content even when medium, PMC or page overlays are present. Further, the mechanism can accommodate various print formatting approaches (e.g., cutsheet emulation, n-up and formdefs) that map pages to partitions using an offset, while not compromising the use of other advanced ADF functions (e.g., as mailpiece sortation, co-mingling and flex print).

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed:

1. A non-transitory machine-readable medium including data that, when accessed by a machine, cause the machine to perform operations comprising:
    receiving an input print job file including a form definition (formdef);
    determining whether the formdef is an N-up formdef;
    generating an output print job file by inserting a Page Modification Control (PMC) overlay into the input print job file as a pre-printed form if the formdef is an N-up formdef; and
    generating the output print job file by inserting a page overlay into the input print job file as the pre-printed form if the formdef is not an N-up formdef.

2. The non-statutory machine-readable medium of claim 1 comprising a machine-readable medium including data that, when accessed by a machine, further cause the machine to perform operations comprising normalizing the input print job file upon receiving the input print job file.

3. The non-transitory machine-readable medium of claim 2, wherein normalizing the input print job file comprises converting medium overlays in the input print job file to page PMC overlays.

4. The non-transitory machine-readable medium of claim 3, wherein medium overlays are confined to a single partition.

5. The non-transitory machine-readable medium of claim 3, wherein normalizing the input print job file further comprises moving existing PMC overlays to pages ensure correct order and layering of pre-existing overlays.

6. The non-transitory machine-readable medium of claim 1, wherein the forms overlay appears first in a page presentation space.

7. The non-transitory machine-readable medium of claim 1, wherein the input and output print job files are Advanced Function Presentation (AFP) files.

8. A printing system comprising a controller to receive an input print job file including a form definition (formdef), determine whether the formdef is an N-up formdef, generate an output print job file by inserting a Page Modification Control (PMC) overlay into the input print job file as a pre-printed form if the formdef is an N-up formdef and generate the output print job file by inserting a page overlay into the input print job file as the pre-printed form if the formdef is not an N-up formdef.

9. The printing system of claim 8 wherein the controller further normalizes the input print job file upon receiving the input print job file.

10. The printing system of claim 9, wherein normalizing the input print job file comprises converting medium overlays in the input print job file to PMC overlays.

11. The printing system of claim 10, wherein medium overlays are confined to a single partition.

12. The printing system of claim 10, wherein normalizing the input print job file further comprises moving existing PMC overlays to pages to ensure correct order and layering of pre-existing overlays.

13. The printing system of claim 8, wherein the forms overlay appears first in a page presentation space.

14. The printing system of claim 8, wherein the input and output print job files are Advanced Function Presentation (AFP) files.

15. A method comprising:
    receiving an input print job file including a form definition (formdef);
    determining whether the formdef is an N-up formdef;
    generating an output print job file by inserting a Page Modification Control (PMC) overlay into the input print job file as a pre-printed form if the formdef is an N-up formdef; and
    generating the output print job file by inserting a page overlay into the input print job file as the pre-printed form if the formdef is not an N-up formdef.

16. The method of claim 15 further comprising normalizing the input print job file upon receiving the input print job file.

17. The method of claim 16, wherein normalizing the input print job file comprises converting medium overlays in the input print job file to PMC overlays.

18. The method of claim 16, wherein normalizing the input print job file further comprises moving existing PMC overlays to pages to ensure correct order and layering of pre-existing overlays.

* * * * *